United States Patent [19]

Smith

[11] Patent Number: 5,298,172

[45] Date of Patent: Mar. 29, 1994

[54] METHOD AND APPARATUS FOR REMOVING GRIT FROM SEWAGE

[75] Inventor: Bryan Smith, Leeds, United Kingdom

[73] Assignee: Hydraulic Design Limited, Leeds, England

[21] Appl. No.: 943,339

[22] PCT Filed: Mar. 8, 1991

[86] PCT No.: PCT/GB91/00378

§ 371 Date: Sep. 10, 1992

§ 102(e) Date: Sep. 10, 1992

[87] PCT Pub. No.: WO91/14053

PCT Pub. Date: Sep. 19, 1991

[30] Foreign Application Priority Data

Mar. 10, 1990 [GB] United Kingdom ............... 9005418

[51] Int. Cl.$^5$ ............................................. B01D 21/26
[52] U.S. Cl. ........................................ 210/747; 210/801;
210/154; 210/170; 210/532.1; 405/47; 405/74
[58] Field of Search ............ 210/153, 154, 170, 532.1,
210/513, 747, 790, 800, 801, 803; 405/36, 43,
44, 45, 46, 47, 48, 49, 74

[56] References Cited

U.S. PATENT DOCUMENTS

| 48,841 | 7/1865 | Scoville | 210/154 |
| 109,474 | 11/1870 | Warner | 405/46 |
| 2,673,451 | 3/1954 | Gariel | 210/154 |
| 3,693,796 | 9/1972 | Michel et al. | 210/170 |
| 3,779,385 | 12/1973 | Strohecker | 210/154 |
| 3,815,742 | 6/1974 | Dubouchet | 210/154 |

FOREIGN PATENT DOCUMENTS

| 928210 | 5/1955 | Fed. Rep. of Germany . |
| 1129458 | 5/1962 | Fed. Rep. of Germany . |
| 2160415 | 7/1973 | Fed. Rep. of Germany . |
| 2929139 | 1/1981 | Fed. Rep. of Germany . |
| 1344442 | 10/1963 | France . |

*Primary Examiner*—Christopher Upton
*Attorney, Agent, or Firm*—Rudnick & Wolfe

[57] ABSTRACT

An improved method and apparatus for removing grit from sewage comprising passing sewage containing grit along a channel, the sewage passing initially through a straight elongate portion of constant width and of length sufficient to stablize the flow and subsequently passing the sewage around a bend portion having an angle of at least 10 degrees from the straight portion and, downstream of the bend, removing the grit from the flow via a port situated at the inside of the bend at the base of the channel via a grit hopper coupled to the port and coupled to a draw-off point to remove the grit for disposal.

16 Claims, 11 Drawing Sheets

METHOD AND APPARATUS FOR REMOVING GRIT FROM SEWAGE

FIELD OF THE INVENTION

The invention relates to an improved method of removing grit from sewage and apparatus for removing the grit incorporating this method.

BACKGROUND OF THE INVENTION

Sewage entering a treatment works can be described as a mixture of four pollution forms, which are rags and paper, grit from soil and roads, organic sludge and dissolved material. The rags and paper suspended in the flow are usually removed by passing the flow through mechanically raked screens. The organic sludge is removed by settlement in large sedimentation tanks in which the flow conditions are quiescent. This material has almost the same specific gravity as water and settles slowly. In turbulent flow conditions, it remains effectively in suspension in the water. The dissolvable material in the water has to be treated. The grit from soil and roads has a specific gravity considerably greater than water. There are a number of methods available for removal of the grit and it is this field of treatment of sewage to which this invention is directed.

Sewage therefore has to be treated in four phases which are usually carried out in the following sequence. Firstly, screenings removal, then grit settlement/removal, then primary sedimentation and then bio-oxidation. Final settlement or other final processes may be added. Occasionally, a further fine screening stage is introduced after the grit removal. The screenings would clog up pipes and plant if allowed to remain in the flow until the settlement stage. Grit could be left in the flow to the primary settlement stage, but may settle out of the connecting pipes and channels causing a maintenance problem. The main reason for removing as much of the grit as possible is to ease the removal and treatment of the settled sludge. The heavier material of the grit renders the sludge more solid and can lead to blockage. During treatment of the sludge, the grit often causes an action similar to concrete setting and has to be dug out of the plant. This binding and setting of grit is known as accretion.

The grit is transported in water by means of several mechanisms. If the flow is fast and turbulent, the majority of the grit will be transported in suspension. At more normal levels of flow, speed and turbulence, the grit particles bounce along the bottom of the channel often colliding with each other in an action know as saltation. At lower flow speeds, the grit forms dunes which are moved slowly along by detaching from their downstream faces in regions of turbulence and moving by saltation to the front of the next dune downstream. If the flow speed is even lower than this, then the dunes build up and the saltation transport between the dunes stops. In correctly designed sewers and channels in treatment works, a velocity of 0.8 to 1.2 meters per second is aimed at so that grit transport is either in suspension or by saltation.

DESCRIPTION OF THE PRIOR ART

Figure 1:
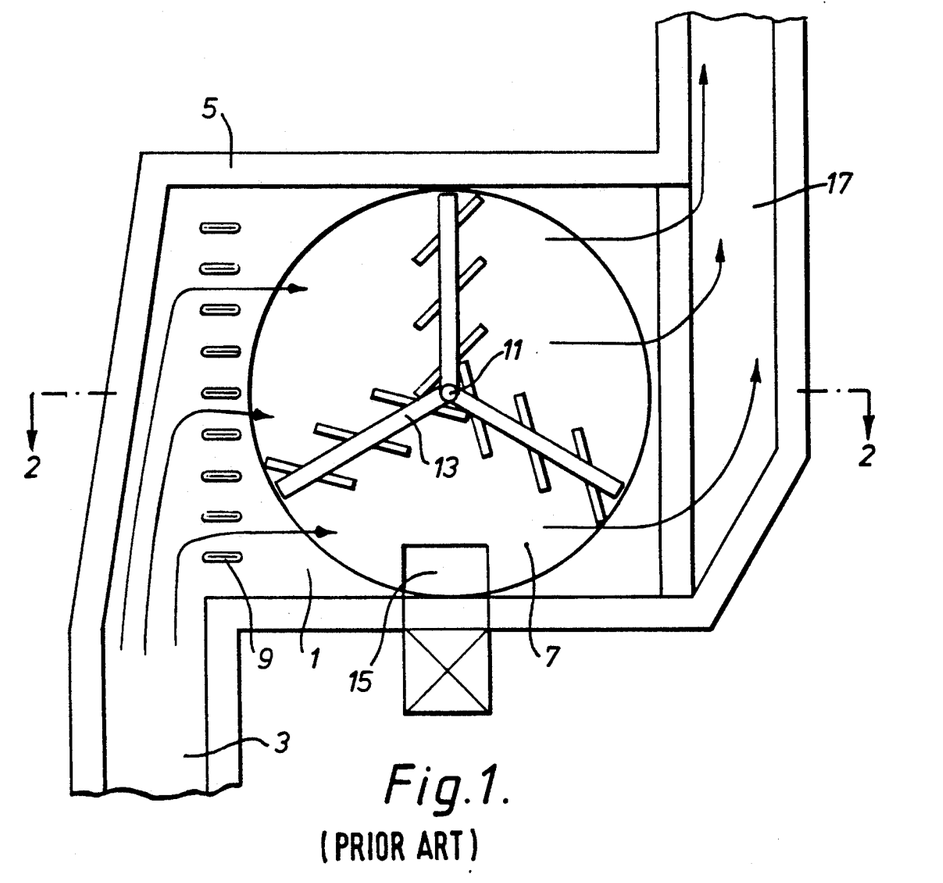
FIG. 1 is a plan view of a first example of prior art.
Figure 2:
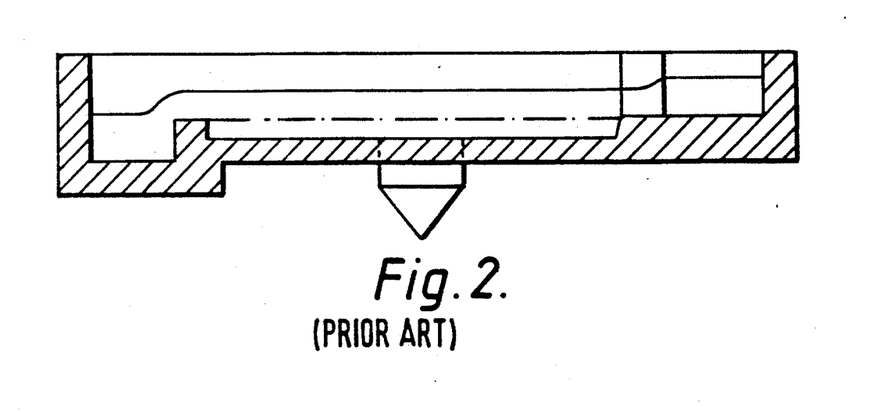
FIG. 2 is a cross-sectional view taken along line 2—2 of FIG. 1.

A first example of apparatus for removing grit from sewage that is well known is shown in FIGS. 1 and 2 of the drawings. This is known as a detritor. The sewage is passed from a channel through a set of flow straighteners in a much widened out channel. The widening out of the flow reduces the velocity of the water considerably. If the velocity is reduced to 0.3 meters per second, then grit falling out onto the bottom of the chamber is not moved forward. The diameter of the settling basin is between 4 and 12 meters and therefore takes up a large plan area. A scraper member incorporating three scraper arms is rotatably mounted on a member which is suspended from a bridge across the chamber. The scraper is submerged in the flow, but there are no bearings within the chamber which would be damaged by the grit. These rotate and move the grit that has fallen onto the base of the channel towards a hopper mounted at the side of the channel. In the example shown, the chamber is in the form of a circular dish.

Not all the grit is removed by this technique, as particles of less than 0.5 mm diameter can be transported out of the basin. Further reducing the velocity of flow through the settling basin would ensure that even grit particles of this size would be retained. However, a compromise has to be adopted, because some organic particles have the same settling mechanics as these fine grits. If flow conditions in the settlement basins were more quiescent, the large proportions of organic sludge would be removed with the grit, posing a washing and disposal problem. The problem with this design is that contrary to the basic premise of the design, many of these basins do not have uniform velocity distribution and streams of faster flowing water often occur sweeping larger grits through the basin. This results in many basins retaining as little as 30% of the incoming grit. To allow for any unevenness on the basin surface, the scrapers cannot be in direct contact with the base but have to be spaced therefrom. This means that there is always a small amount of grit which is going to be left on the base of the chamber. Moreover, if for any reason, there is a mechanical failure, grit will settle on the base of the chamber in dunes, and the scrapers will be then set in position. The only way that the detritor can then be used is for operators to manually come in and remove the grit from the base of the chamber before it can be reused.

Figure 3:
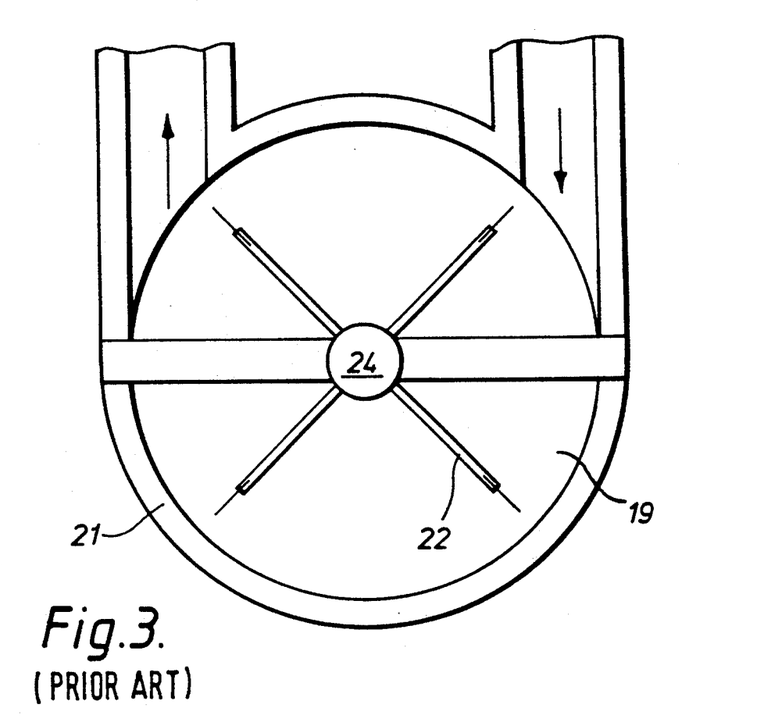
FIG. 3 is a plan view of a second example of prior art.
Figure 4:
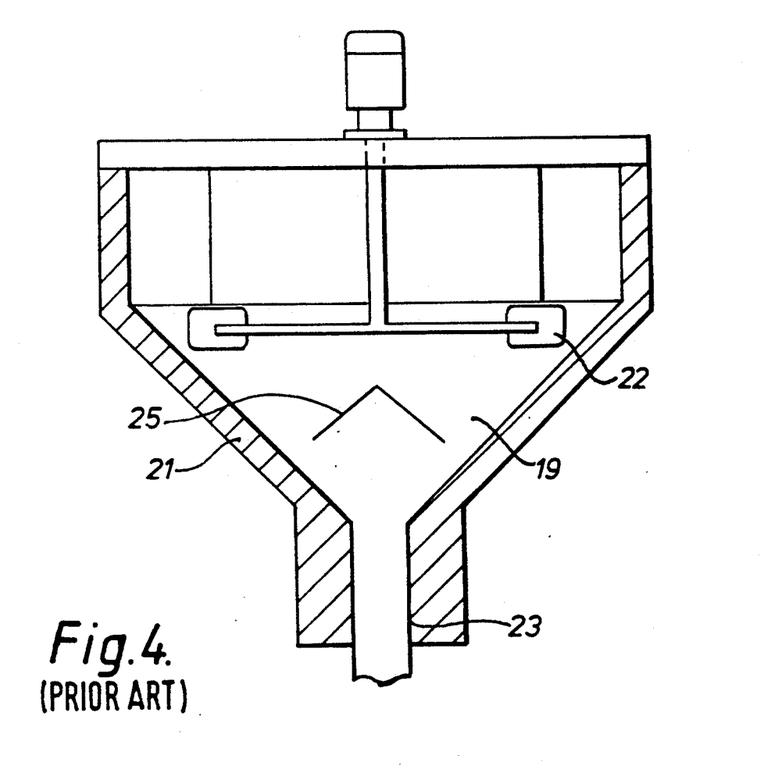
FIG. 4 is a sectional view through the apparatus shown in FIG. 3.

A second method for removal is illustrated in FIGS. 3 and 4 of the drawings in an apparatus which is a form of Pista grit trap. This apparatus relies on the flow being caused to rotate in a large circular hopper with a conical bottom. The rotation is caused by paddles which are rotatably mounted and driven by an electric motor mounted on a bridge across the tank. The rotation of the flow causes particles heavier than water, i.e. the grit, to move to the centre and downwards. The grit collects at the bottom of the cone and is withdrawn. An inverted baffle is mounted within the hopper to separate the grit from the rotating flow. This unit can allow grit to be washed out of the basin and if air is used to agitate the grit in the bottom, some grit is washed out along with settled organic matter.

Figure 5:
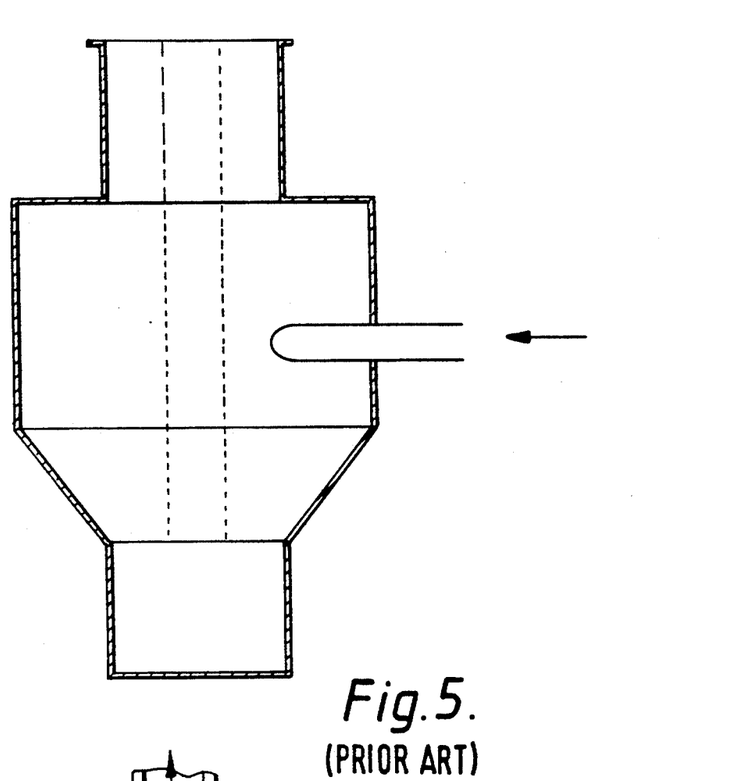
FIG. 5 is a schematic sectional view through a third example of apparatus of the prior art.
Figure 6:
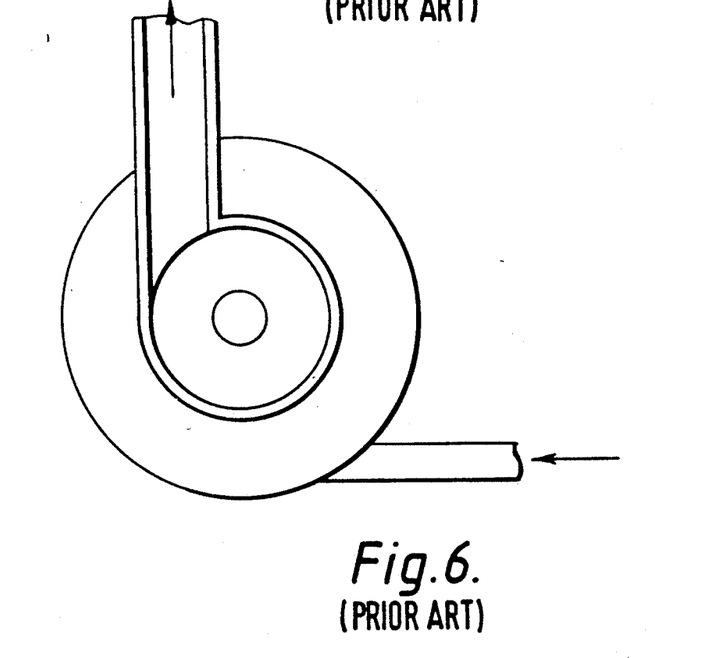
FIG. 6 is a plan view of the apparatus shown in FIG. 5.

A new grit removal apparatus which has recently been introduced is the type shown schematically in FIGS. 5 and 6 of the drawings. The unit comprises typically a drum of 0.5 to 6 meters diameter where the flow enters the cylindrical drum in a tangential direction. This tends to set up a rotating flow which causes the heavier than water particles to descend in the drum and the lighter than water particles to ascend. The action of the unit is similar to vortex separators and hydrocyclones used in industry.

These three methods and apparatus are the three proprietary products which are available on the market for separating grit from sewage.

There are two other methods of removing grit from sewage which are used.

A first method is illustrated in the drawings and consists of a constant velocity tank which uses an elongate rectangular tank which is long enough to straighten the flow and therefore allow the grit to settle on the base of the channel. The grit is then sucked out of the base of the channel by the suction of a pump mounted on a travelling bridge over the channel. The second method is a spiral flow grit channel which sets up a spiral flow of the water within the tank. Fine bubbles of air are fed into the tank along one of its walls which induces a flow upwards to maintain the spiral flow. It exaggerates the difference between the specific gravity of the grit and the specific gravity of the water, since the water becomes entrained with air and its specific gravity therefore reduces. This means that the grit falls out of suspension very quickly.

SUMMARY OF THE INVENTION

According to the invention, there is provided a method of removing grit from sewage comprising passing sewage containing grit along a channel, the sewage passing initially through a straight elongate portion of length sufficient to stabilize the flow and subsequently passing around a bend having an angle of at least 10 degrees from the straight portion and, downstream of the bend, removing grit from the flow via a port situated at the inside of the bend at the base of the channel.

The method depends on the mechanism which in nature causes rivers to take a meandering path across plains. When water flows through a straight channel, if the channel is long enough for flow conditions to reach a stable regime such that upstream disturbances have no longer an effect, then the velocity near the walls and bottom will be low with a central core of higher velocity in the centre of the channel and near the free water surface. Grit will be transported by saltation and in suspension near the bottom in the region where the rate of increase of velocity is large.

As the channel curves in a bend, a rotation of flow is set up where the strength of the rotation is a function of the curvature radius as compared to the width of the channel, the velocity and the angle through which the flow is turned. A rotation so set up forms a higher velocity core in the form of a helix which has the result that material heavier than water, i.e. the grit, will be moved to the bottom of the channel on the inside of the curve whilst lighter material will be moved to the top near the water surface on the outside of the curve. Thus, downstream of the bend, grit travels along the bed close to the wall of the inner curve edge of the channel and against the lower part of the wall and if a port is located on that inside edge at the bottom of the channel, the heavier than water grit will be removed from the flow. The water and lighter material will be transported forward.

Sewage grit comprises a range of particle sizes with a specific gravity considerably greater than water. The proportion of any specific particle size in a sample of sewage grits can vary. The total quantity and rate at which grit arrives at a sewage treatment works is variable from site to site. It depends, among other things, on the type of catchment area, the hydraulic characteristics of the sewerage system and the flow rate at the time. The operation of the apparatus is independent of the grit loading and thus has a wide range of applications.

Some organic particles have the same settling mechanics as fine grits, and so in prior art removal systems utilizing the settlement process, the grits often become contaminated with organic material by further processing prior to disposal of the grits to tip. In the apparatus in accordance with the invention, since only a relatively small proportion of the total flow is passed into a grit removal hopper for settlement, there will only be limited contamination. The apparatus will typically be located downstream of fine sewage screens. Therefore, providing that the screens are designed in accordance with good practice, it is unlikely that gross solids will penetrate to the apparatus in any significant quantities. However, it is a feature of the apparatus that gross solids will be diverted to the outside of the channel limiting the potential for gross solids capture.

Apparatus in accordance with the invention will comprise a channel including a straight elongate portion of constant width having a length sufficient to stabilize the flow and a bend portion being at an angle of at least 10 degrees to the axis of the straight portion of the channel; at least one port situated at the base of the channel downstream of the bend on the inside of the bend; and a grit hopper coupled to each port, coupled to a draw off point to remove the grit for disposal.

The length of the straight portion has to be long enough to allow stable flow patterns to be established. If the channel upstream of the straight portion is curved, then the length of the straight portion would have to be longer if the curvature is opposite to that chosen in the apparatus, or shorter if the upstream bend is in the same direction as that on the apparatus. The straight portion of the channel will typically have a length of the order of at least 10 times the width of the channel. It should also be at least 10 times the maximum depth of flow to ensure that grits approaching the bend are transported in the lower part of the flow near to the bed of the channel. Typically, the cross-section of the channel is constant, especially throughout the length of the straight portion. However, it is not essential that the width of the channel is constant. If the cross-section is to change, it has to be changed very gradually to maintain stability of flow.

The channel downstream of the bend should be straight and have the same cross-section as the straight portion of the channel and bend. In order to avoid interference with the operation of the rest of the apparatus, the length of the downstream channel, measured from the end of the bend, should not be less than twice the channel width. In practice, the length of the downstream channel will be much longer, especially if a standing wave flow measurement flume is installed downstream.

Although the channel may have a sloping or curved base, it is preferred that the channel has a rectangular cross-section.

The bend can be a right hand or left hand bend and the radius of the bend is chosen for the degree of effect that is required.

The angle of the bend and radius of the bend are interrelated. A sharp turn without a bend or any combination of angle and bend radius will, to a degree, concentrate grits against the inside face of the turn. Irrespective of the bend radius, there is only a slight effect at bend angles of up to 10 degrees. However, as the angular deflection is increased, the radius of the bend must also be increased if flow is not to separate and spread the grits across the width of the channel. For instance, if the angle of the bend is greater than 10 degrees and the radius is less than 2.5 to 3 times the width of the channel, the flow will exhibit a tendency to separate. The angular change of direction depends on the average velocity, the radius and the channel width. The angle will usually be less than 45 degrees but can be up to 180 degrees. There is a slight effect with any small angle, but the effect is only pronounced with angles of more than 10 degrees.

Preferably, the angle of the bend is between 20 and 40 degrees and the radius of the bend is between 5 to 15 times the channel width. More preferably, the angle described by the bend is 30 degrees and the radius of the bend is 12 times the channel width.

Typically, the width of the channel will be between 600 mm and 1200 mm, although it is possible for the apparatus to be made with different sizes of channels.

The relationship between the depth of the approach flow of sewage approaching the bend and the width of the straight portion is an important factor in the correct operation of the apparatus. In a preliminary treatment plant, it is normal practice to locate a standing wave flume downstream of the grit removal plant. The main purpose of the flume is to measure the flow. In doing so, the flume also sets the depth in the channel to give that required for the grit and screenings removal plants. Preferably, the apparatus will be installed with an appropriately sized downstream standing wave flume to set the required water depth/flow parameters.

Preferably, the preliminary treatment channels are designed so that, as far as possible, grits are transported through screens to the grit removal plant over the full range of expected inflows. This would require a minimum channel velocity of approximately 0.70 m/s. Excessive velocities must be avoided if efficient screenings removal is to be achieved. This can be achieved if maximum mean flow velocities do not exceed approximately 1.00 m/s.

The apparatus will remove grits over the range of approach velocities likely to be encountered in a preliminary treatment works designed in accordance with good practice. The lower limit of approach velocity is that which will transport grit in the straight portion. The apparatus will remove grits from sewage flowing at velocities well in excess of those likely to be encountered in practice but at velocities in excess of 1.30 m/s, the efficiency of capture begins to reduce. The optimum maximum approach velocity is 1.00 m/s.

The width of the channel to give the above range of approach velocities is dependent on the downstream hydraulic controls. The operation of the apparatus is independent of the channel width but it is preferred that the depth of the approach flow should be approximately 1.0 to 1.2 times the channel width at maximum flow.

If the apparatus is installed in accordance with the above criteria, head losses due to the apparatus will be low, of the order of 0.030 m.

The location of the port through which the grit passes into the collection hopper is important to the efficient operation of the apparatus. If the port is positioned upstream of the end of the bend, some of the approaching grits will not be concentrated against the inner wall of the bend. If the port is positioned too far downstream of the end of the bend, the grits will naturally begin to spread across the width of the channel. In either case, the efficiency of the apparatus will be reduced. Therefore, for optimum performance, preferably the leading edge of the port commences at the end of the bend.

The port is typically rectangular in shape but there are a number of possible optional port arrangements which will work satisfactorily. The main port area should be concentrated on the floor of the channel but could, for example, extend up the inside wall. However, a simple rectangular floor port is preferred.

The port may simply comprise a hole through which the grit falls to the collection hopper. However, it is preferred that the port consists of a grit removal device including an inlet port, a flow deflector and an exhaust port, arranged such that the sewage containing the grit flows through the inlet port, deposits the grit and flows out of the exhaust port into the channel.

The length and width of the inlet port is important to the efficient operation of the apparatus. Any width and length of inlet port will collect grits. The minimum width of the inlet port is dictated by the practicalities of construction and the need to prevent partial blockage in the unlikely event that gross solids penetrate past the upstream fine screens and attempt to enter the grit collection hopper. Too wide an inlet port will increase the proportion of organic solids collected. The preferred width of the port is half the width of the channel at the bend. If the inlet port is too short, grit capture will not be totally effective and if it is too long, secondary flow effects will become dominant and the effectiveness of the flow deflector will be reduced. The preferred length of the inlet port is equal to the width of the channel.

The flow deflector is positioned at the downstream end of the inlet port. The main purpose of the deflector is to aid the capture of grits thrown up into the flow owing to the interaction of particles as they saltate down the channel and bend. Additionally, the deflector diverts flow into the inlet port which improves particle capture and directs the grits down into the grit collection hopper towards the point of removal.

The flow deflector is in the form of a plate which extends into the flow between the inlet port and the exhaust port.

The inclination of the flow deflector is not crucial to the operation of the apparatus. However, if the inclination to the vertical is excessive, the effectiveness of the deflector will be reduced. Preferably, the flow deflector is vertical.

Preferably, the width of the flow deflector is at least one quarter of the channel width. Flow deflector widths approaching half the channel width will lead to excessive head losses and increase the potential for the capture of organic particles. The preferred width of the flow deflector is one third of the channel width.

Preferably, the flow deflector extends to a height above the channel bed of not less than the maximum water level in the approach channel. To improve the penetration of grits into the collection hopper and avoid flow short circuiting through the exhaust port, the flow deflector should extend below the base of the channel to a depth of not less than 0.3 m or half the approach channel width, whichever is the greater.

The thickness of the flow deflector is on the one hand limited by practical minimum material thicknesses, and on the other by the need to avoid the formation of a hydraulic control. The flow deflector is constructed from metal or plastic plate or in the case of wider units from either pre-cast or insitu formed concrete. In any event, the thickness of the flow deflector should preferably not exceed 0.100 m. It is possible to use a flow deflector with an inlet port without an exhaust port, but preferably an exhaust port is included.

The cross-sectional area of the exhaust port controls the total quantity of flow passing through the grit collection hopper. If the exhaust port cross-sectional area is too small, grit capture will not be as positive. If, however, the exhaust port area is too large, excessive quantities of water will pass through the grit collection hopper and in so doing carry a proportion of the finer grit particles into the downstream channel. It is a feature of the apparatus that by adjusting the cross-sectional area of the exhaust port, a varying range of grit particle sizes can be retained in the grit collection hopper.

The exhaust port is conveniently placed in the floor of the channel and is of the same width as the inlet port. Other arrangements which allow flow to pass through the grit collection hopper are equally acceptable. The length of the exhaust port is typically less than the inlet port and is preferably one quarter of the channel width.

The positioning of the exhaust port or ports is not crucial to the operation of the apparatus. However, the quantities of finer particles exhausted will be reduced if it is located immediately downstream of the deflector.

Typically, the grit hopper will follow established practice of having steeply sloping benching to a draw off point. Alternatively, it will be a basin with a flat or more gently inclined base and be equipped with mechanical rakes and scrapers to move the grit for disposal.

Since all that this apparatus requires is a straight channel which then has a bend in it with a grit removal port, much less space is required than for a settlement basin. No mechanical scraping mechanisms are required which means that there is less possibility of mechanical breakdown. Construction costs are much lower than for previous methods. The head loss across the device is made out of the normal hydraulic losses of the channel. This could lead to saving in energy loss of up to approximately 300 mm head of water which is typically about 1/10 of the whole loss through a treatment works. The action of the apparatus depends only upon the geometry and therefore its action is automatic and will not vary with time. Since there is no requirement for the velocity of flow to be reduced, the apparatus will be effective over a wide range of flows and the efficiency will not be flow sensitive. Thus, there will not be so much necessity for carefully controlling the flow through the apparatus. By varying the size of the exhaust port and the angle of the deflector, the size of particles to be removed can be varied. Thus, the apparatus can be engineered to remove any particular size of grit required.

Less organic matter can be removed with the grit due to the turbulence on the main flow helix having a washing action.

The grit can be removed from the hopper by continuous gentle draw off to the washing and disposal arrangements or grit can be drawn off intermittantly using the storage capacity of the hopper which is in line with established practice. If the grit is stored in the hopper, it is usual to inject a small flow of compressed air near the bottom, so that the rising bubbles break up accreted grit and release organic particles. With this device, grit lifted near to the surface would not be reintroduced to the main flow, as can be the case for many prior art apparatus available at present.

Preferably, a sewage treatment works will include several sets of apparatus in accordance with the invention. If one or more of the units need to be taken out of commission, when flow in the channel ceases and it is drained down, there will be no residual grit and other matter, so that the maintenance and odor problems which arise in the detritor will be eliminated.

It will be appreciated by the skilled addressee of the specification that the parameters of channel width, flow velocity, bend angle, bend radius and position of port are all interdependent, but the choice of suitable parameters will be readily apparent to the skilled addressee.

BRIEF DESCRIPTION OF THE DRAWINGS

Examples of apparatus in accordance with the invention will now be described and contrasted with the prior art, with reference to the accompanying drawings in which.

DESCRIPTION OF THE PREFERRED EMBODIMENTS

A detritor 1 is shown in FIGS. 1 and 2 which relies on the widening and substantial decrease in flow speed of the sewage. The sewage is passed from a straight channel 1 into a much wider channel 5 including a circular basin 7 for settlement purposes. The flow passes through a set of flow straighteners 9 which are intended to straighten the flow and even out the velocity of the sewage as it flows through the tank 5. A scraper member 11 is suspended from a bridge across the basin 7 (not shown) and is mounted to rotate. It has two, three or four arms 13 under which are mounted blades to scrape along the base of the basin 7. The reduction in the velocity of the sewage through the basin 7 causes the grit to form dunes on the base of the basin. The scraper blades 13 push the grit around until they pass into exit port 15 to pass out into a grit hopper.

The detritor has a number of disadvantages which have been outlined above, but, in normal flow, the main disadvantage is that the velocity is not constant throughout the chamber and therefore, in the areas where the flow is much faster keeps the grit in suspension and therefore allows the grit to be passed out of the outlet channel 17. The movement of the scraper member 11 itself disturbs some grit as it passes the outlet weir 17 and causes grit to be reentrained in the flow, allowing it to be passed to the outlet channel. Other disadvantages lie in that if the scraper 11 is stopped by operatives or, say, by power failure, grit builds up in the basin 7 and can cause the mechanism to be overloaded with the result that the scraper cannot rotate or mechanical damage could occur.

The Pista grit trap 19 illustrated in FIGS. 3 and 4 depends on the rotation of the flow around a conical tank 21. Paddles 22 are rotated by an electric motor 24 mounted on a bridge across the tank. The grit tends to fall to the base of the tank to an outlet 23. An inverted v-shaped baffle 25 tends to separate the grit from the rest of the flow.

In the third example of apparatus of the prior art illustrated in FIGS. 5 and 6, the removal of grit depends on a vortex separation effect where a tangential inlet to a cylindrical drum introduces a rotating flow which causes the grit heavier than water to descend and particles lighter than water to ascend.

Figures 7, 8, 9:
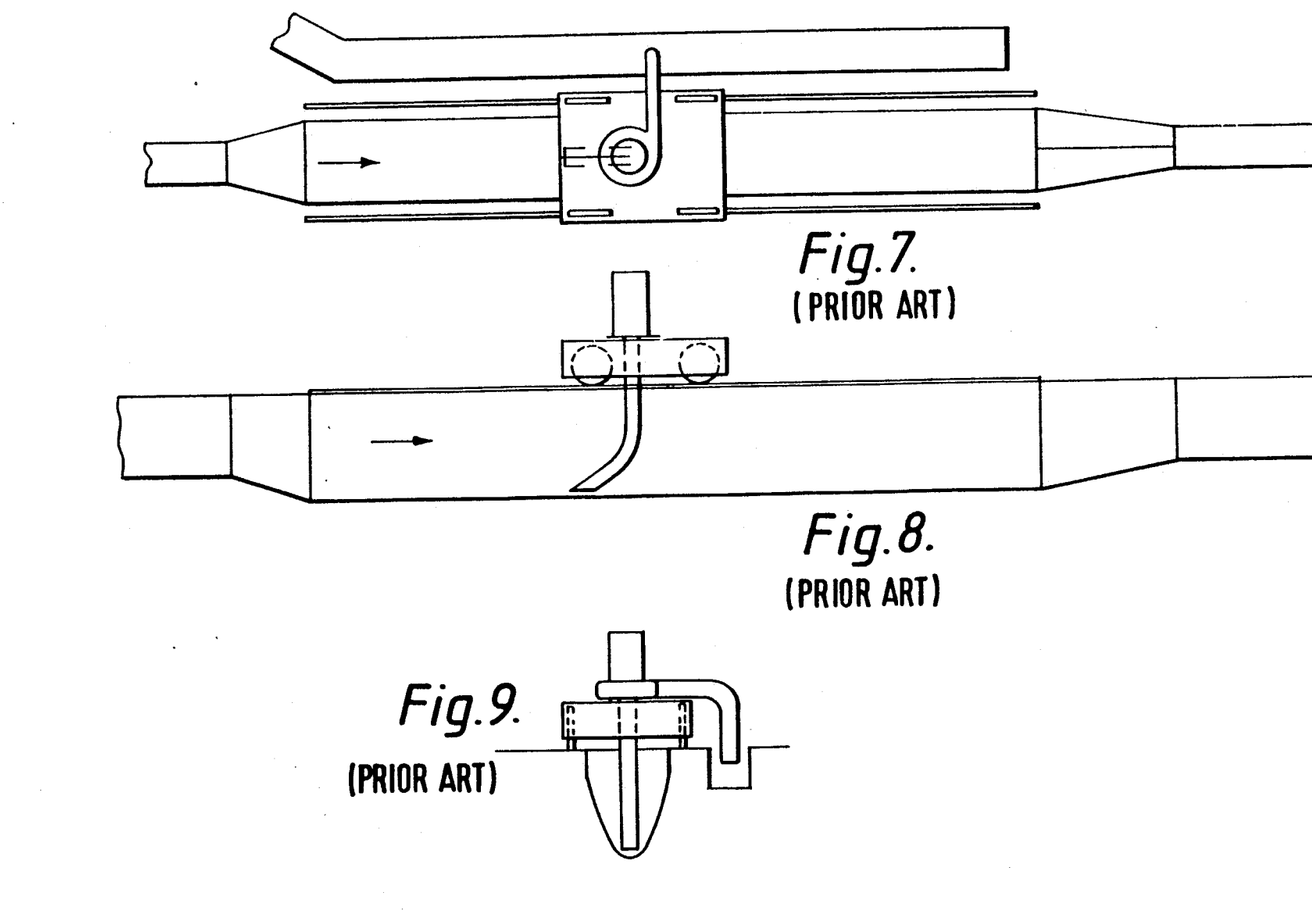
FIG. 7 is a plan view of a fourth example of apparatus of the prior art.
FIG. 8 is a longitudinal sectional view through the apparatus shown in FIG. 7.
FIG. 9 is a lateral sectional view through the apparatus shown in FIG. 7.

A fourth example of apparatus is illustrated in FIGS. 7 to 9 which consists of an elongate tank which is long enough for the flow to straighten and the grit to settle on the base of the tank. The grit is then removed by suction of a pump mounted on a bridge to traverse the length of the tank.

Figure 10:
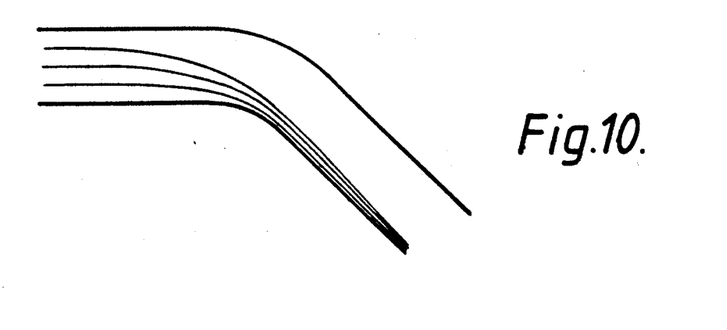
FIG. 10 illustrates the typical path followed by grit at a bend in a channel.
Figures 11, 12:
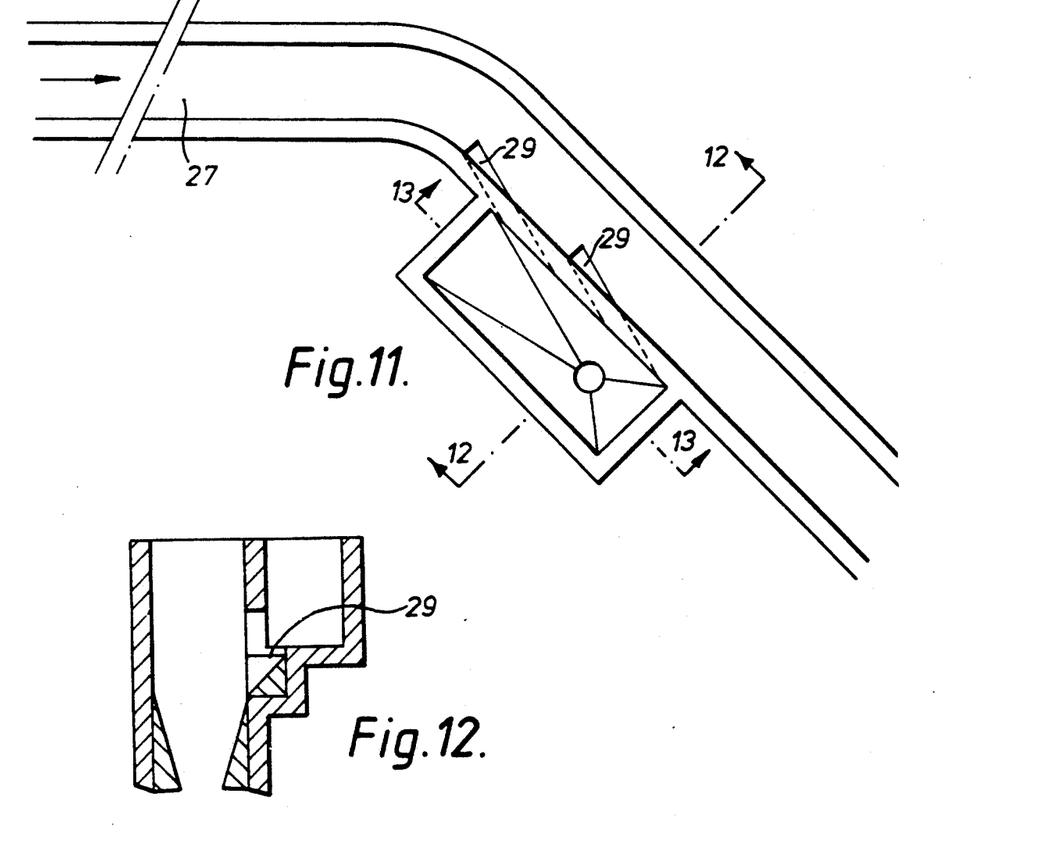
FIG. 11 is a schematic plan view of a first example apparatus in accordance with the present invention.
FIG. 12 is a sectional view taken along line 12—12 of FIG. 11.
Figure 13:
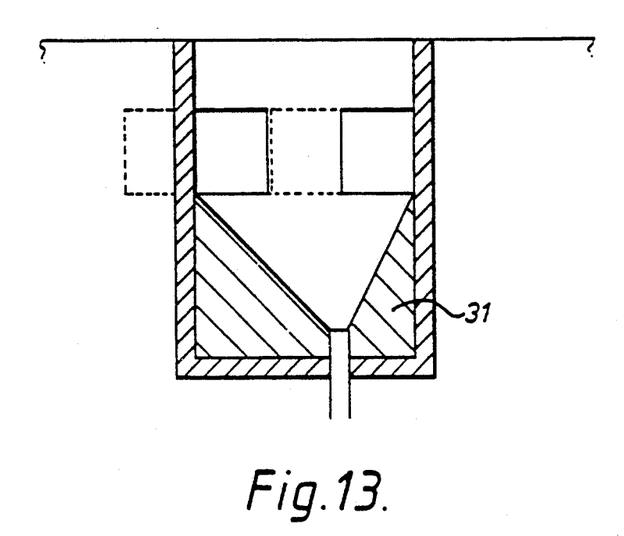
FIG. 13 is a sectional view taken along line 13—13 of FIG. 11.

In an apparatus in accordance with the invention, sewage is passed along a straight channel of constant cross section 27 of length at least 10 times the width of the channel. The channel then bends in plan view with an angle of 45 degrees to the straight channel and the radius of the bend is three times the width of the channel. Positioned at the downstream end of the bend or a short distance thereafter is the first, of two ports 29 on the inside edge of the curve. These are straight-edged ports which have vertical sides as shown in FIG. 12. They are positioned at 15 degrees to the channel. Grit is caused to fall through the ports 29 to grit hopper 31 shown in FIG. 13. This is asymmetric with a sloping bottom. FIG. 10 illustrates a typical grit path described at a bend which shows the desired position for the ports 29. By using two ports ensures that all the grit is removed.

Figure 14:
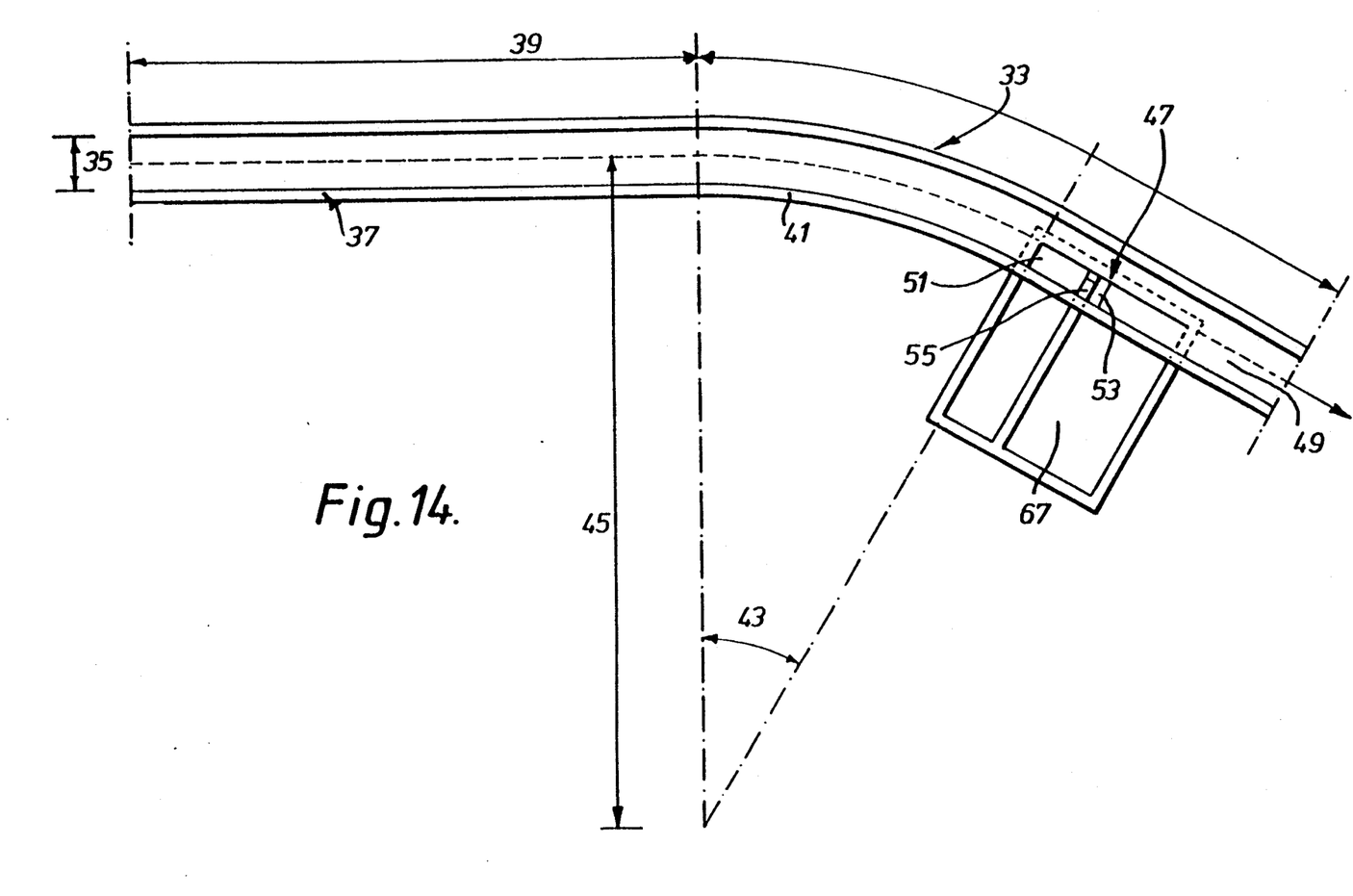
FIG. 14 is a schematic plan view of a second example of an apparatus in accordance with the invention.

In a second example of apparatus in accordance with the invention, sewage containing grit is passed along a channel 33 of constant width 35 and cross-section throughout. The cross-section is rectangular.

The channel is arranged such that the sewage passes initially along a straight elongate portion 37 having length 39 equal to 10 times the width 35 of the channel.

The sewage then passes through bend portion 41 which describes an angle 43 to the axis of the straight portion 37 of 30 degrees. The radius 45 of the bend is equal to 12 times the width 35 of the channel.

Downstream of the bend 41 is a port 47 situated at the inside of the bend 41 and at the base of the channel 33.

The port 47 is shown in detail in FIGS. 15 to 18 of the drawings. It is situated in a downstream channel 49 which is straight and of the same cross-section as straight portion 37. It has a length of at least twice the channel width 35.

The port 47 consists of a grit removal device including an inlet port 51, an exhaust port 53 and a flow deflector 55. The inlet port 51 comprises a hole in the base of the channel 33. The length 57 of the hole is equal to the width 35 of the channel. The width 59 of the inlet port 51 is equal to half the width 35 of the channel so that the proportion of organic solids collected is kept to a minimum whilst ensuring that the grit in the sewage can be collected.

Figure 15:
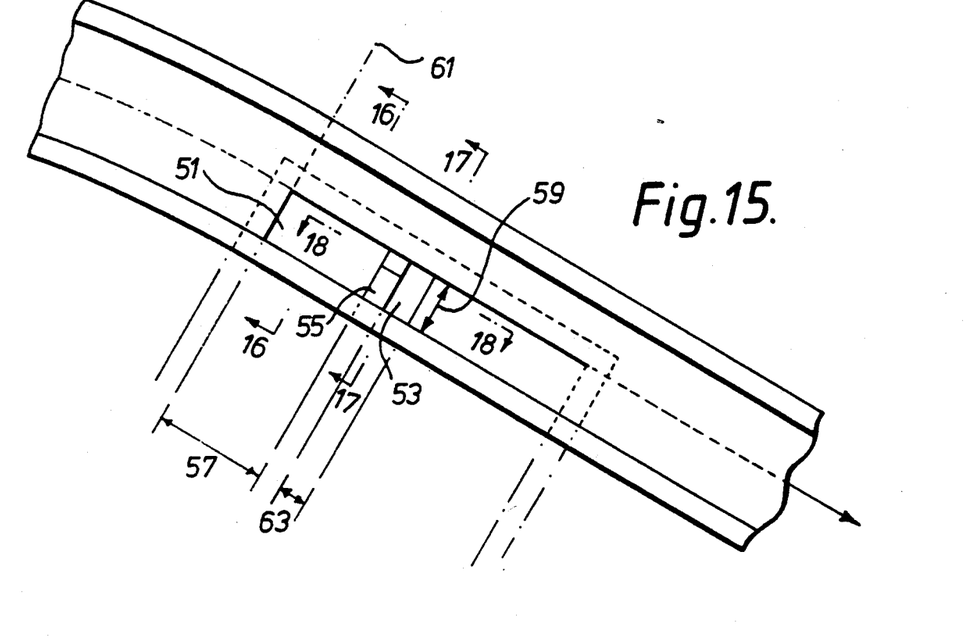
FIG. 15 is an enlarged view of part of FIG. 14.
Figure 16:
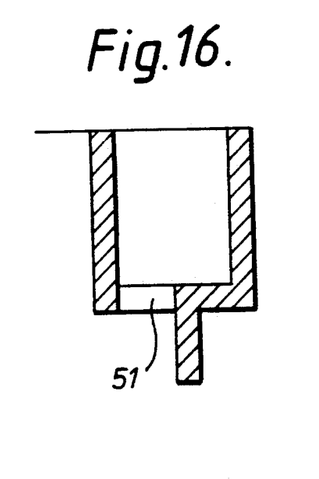
FIG. 16 is a sectional view taken along line 16—16 of FIG. 15.
Figure 17:
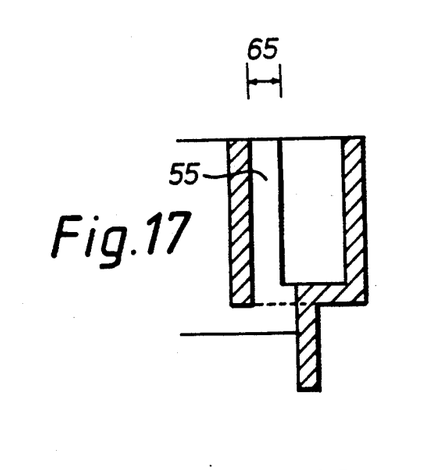
FIG. 17 is a sectional view taken along line 17—17 of FIG. 15.
Figure 18:
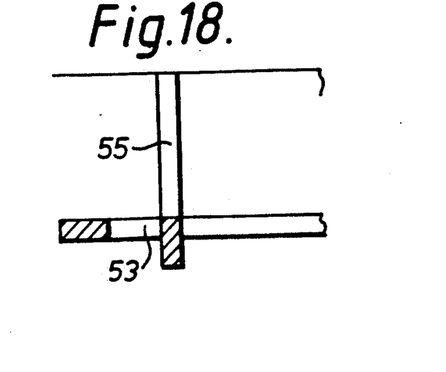
FIG. 18 is a sectional view taken along line 18—18 of FIG. 15.

The inlet port 51 is arranged so that it lies at the end 61 of the bend portion 41.

Downstream of the inlet port 51 is exhaust port 53 which has the same width 59 as the inlet port 51, for convenience. The length 63 of the exhaust port is equal to one quarter of the channel width 35.

Between the inlet port 51 and the exhaust port 53 is flow deflector 55. This comprises a plate which extends into the sewage flow and down under the base of the channel 33.

The flow deflector 55 is vertical and has a width 65 equal to one third of the channel width 35. The height of the flow deflector is such that it extends to not less than the maximum level in the approach channel 37.

It extends below the base of the channel to a depth of one half of the channel width 35.

The deflector 55 is here a metal plate having a thickness of less than 0.1 m.

Figure 19:
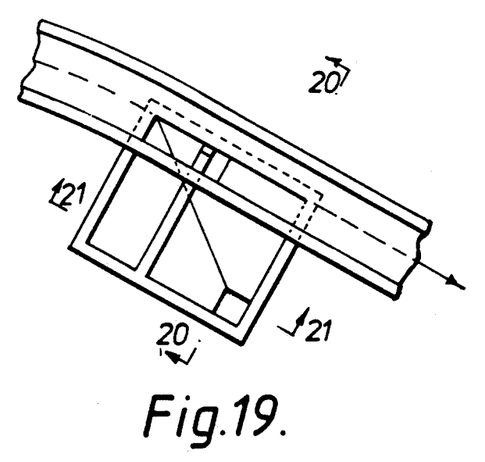
FIG. 19 is a detailed view of the hopper used in the apparatus of FIG. 14.
Figure 20:
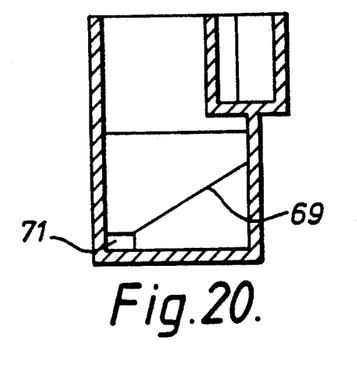
FIG. 20 is a sectional view taken along line 20—20 of FIG. 19.
Figure 21:
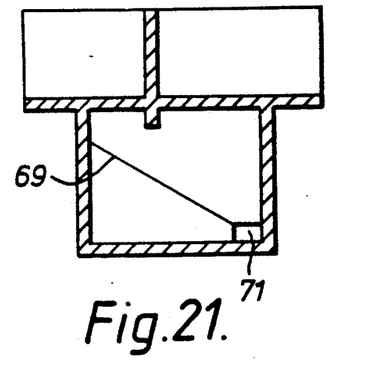
FIG. 21 is a sectional view taken along line 21—21 of FIG. 19.

The inlet port 51 and the exhaust port 53 both feed to grit collection hopper 67, shown in detail in FIGS. 19 to 21. The hopper 67 has steeply sloping benching 69 to draw-off point 71.

The apparatus is used by passing grit containing sewage through the channel with a depth of 1 to 1.2 times channel width 33. The velocity of the flow is typically 1.00 m/s.

The sewage is passed through the straight portion 37 whose length is greater than 10 times its depth to allow a stable flow pattern to be established. The grits in the sewage are transported in the lower part of the flow near the bed of the channel. The sewage then passes through bend portion 41 where the grits are concentrated against the inside face of the turn. The flow develops a core of high velocity rotation in the form of a helix so that the grit moves to the bottom of the channel at the inside of the curve whilst the lighter material is moved to the top near the water surface on the outside of the curve.

At the end edge 61 of the bend 41 is inlet port 51 through which sewage containing a large quantity of grit flows. The flow deflector 55 aids the capture of the grits thrown up into the flow owing to the interaction of particles as they saltate down the channel and bend. The flow deflector 55 helps to direct the flow into the inlet port 51 and directs the grit downwards into hopper 67.

The flow deflector 55 directs the flow deep into the grit hopper 67. The grit is deposited and the flow then flows upwards out of the hopper 67 and out through exhaust port 53. The sewage returning to the channel is substantially without grit and the sewage may then be further processed.

Figure 22:
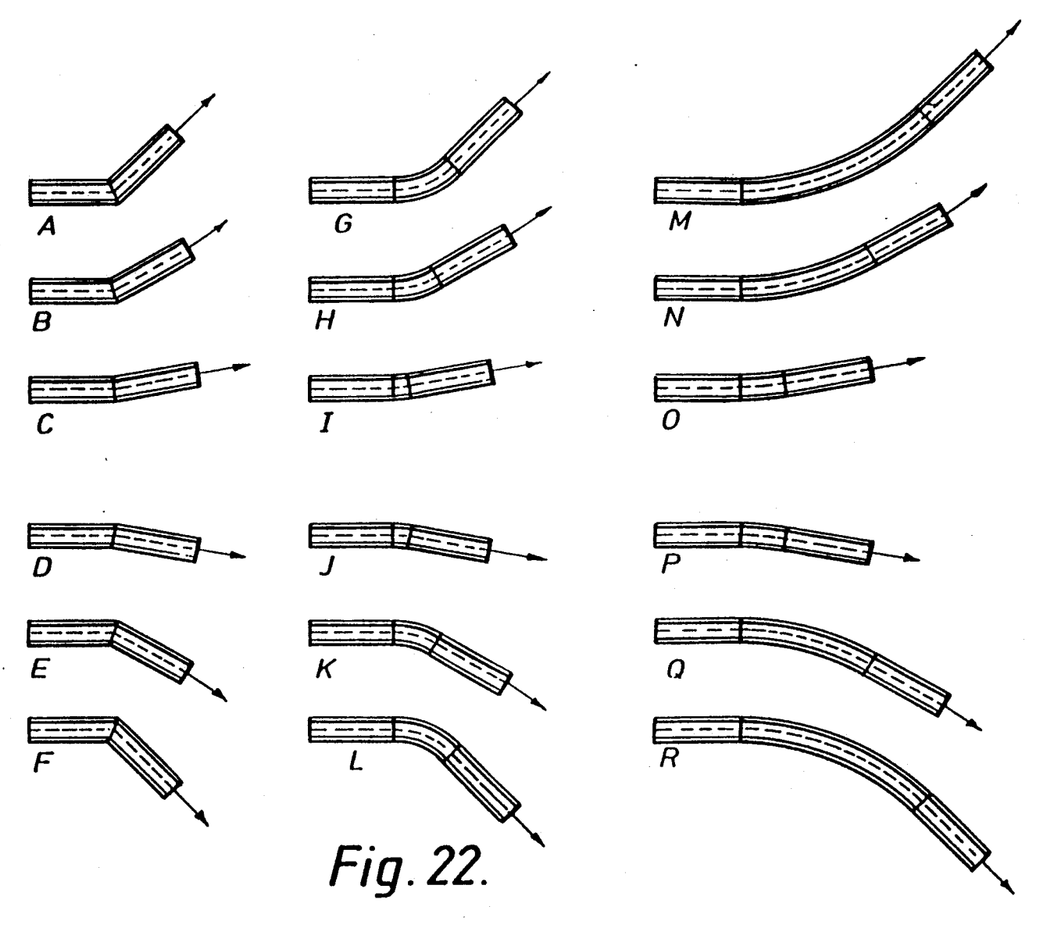
FIG. 22 is a schematic view of a variety of possible plan views of modifications to the apparatus in accordance with the invention.

FIG. 22 illustrates a variety of plan views of variations to the apparatus, specifically the different radii and angles of bends which can be utilized. The bend may be a left hand bend (A-C, G-I or M-O) or right hand bend (D-F, J-L, P-R). It can be very sharp (A-F) or can be gradual with a large radius (M-R).

Figure 23A:
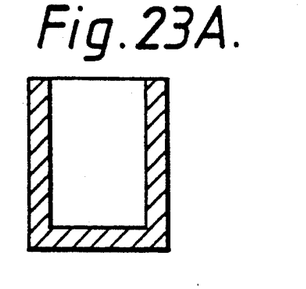
FIGS. 23A to 23D are sectional views through the channel.
Figure 23B:
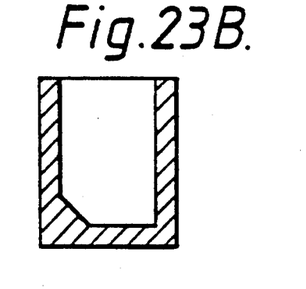
Figure 23C:
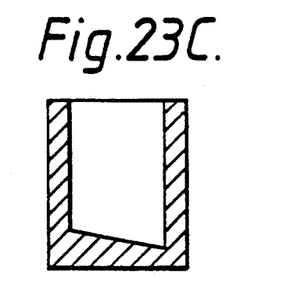
Figure 23D:
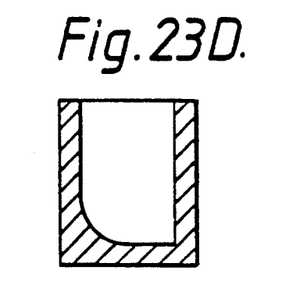

The angle described by the bend can be as small as 10 degrees (C,I,O,D,J,P) or large, of 45 degrees (A,G,M,F,L,R). Four examples of cross-sections of the channel 33 are illustrated in FIGS. 23A to 23D. The apparatus shown in FIG. 14 has a rectangular cross-section as shown in FIG. 23A. In some cases, the cross-section may be arranged to slope along one edge FIG. (23B) or across the base FIG. (23C). Alternatively, one edge may be rounded FIG. (23D).

Figure 24:
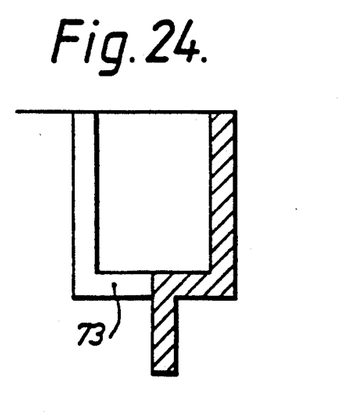
FIG. 24 is a sectional view through the channel showing a modified inlet port.

Although the inlet port may comprise a hole in the base of the channel, it may also be arranged as shown in FIG. 24. Here the port 73 extends up the side of the channel on the inside edge of the bend.

Figure 25:
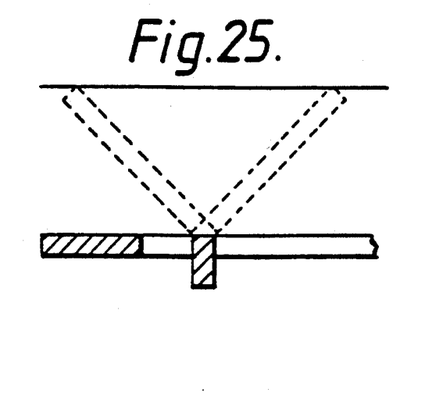
FIG. 25 illustrates modifications to the deflector.

The flow deflector 55 plate shown in FIG. 14 is vertical. It is possible for the plate to be arranged at an angle to the vertical and the limits of the angle are shown in FIG. 25 in dotted lines.

Figure 26:
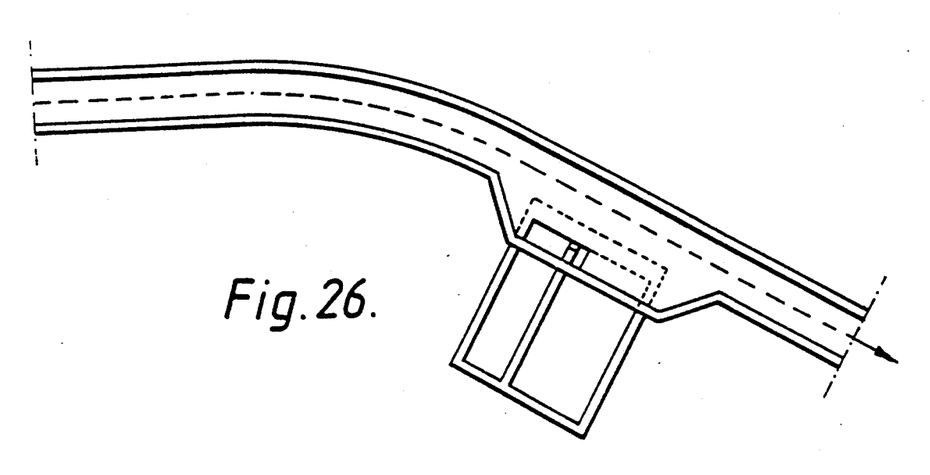
FIG. 26 is a schematic plan view of a third example of an apparatus in accordance with the invention.

Although the channel width has to be constant throughout the length of the straight portion, the channel width does not have to be constant throughout its whole length. FIG. 26 illustrates a third example of apparatus, in accordance with the invention, where the channel widens after the bend in the region of the grit collection device. The width of the inlet port is half the width of the channel in the straight portion.

I claim:

1. A method of removing grit from sewage comprising passing sewage containing grit along a channel, the sewage passing initially through a generally straight elongate first channel portion of length sufficient to stabilize the flow and of generally constant width, and subsequently passing the sewage around a bend formed as part of said channel and having an angle of between 10 degrees and 180 degrees from the first channel portion, removing grit from the flow via a port situated downstream of and at the inside of the bend at the base of the channel, and passing the sewage through a second channel portion extending downstream of the bend and having a length not less than twice the width of said first channel portion such that the velocity of the flow of sewage through the channel including the second channel portion is less than 1.3 meters per second.

2. A method according to claim 1, in which the depth of the flow in the straight portion of the channel is substantially 1 to 1.2 times the channel width at maximum flow.

3. An apparatus for removing grit from sewage comprising a channel including a straight elongate first channel portion having a generally constant width and a length sufficient to stabilize the flow, a bend portion describing an angle between 10 degrees and 180 degrees relative to the first channel portion situated at the base of the channel downstream of and proximate to the bend portion at the inside of the bend portion, a grit collection hopper coupled to each port and coupled to a draw off point to remove the grit for disposal, and a second channel portion extending downstream of the bend portion and having a length not less than twice the width of the first channel portion, and wherein the apparatus is arranged to remove grit from sewage having a velocity of flow through the apparatus which is less than 1.3 meters per second.

4. The apparatus according to claim 3, in which the horizontal length of the first portion of the channel is at least 10 times the maximum depth of flow of sewage and at least 10 times the horizontal width of the first channel portion.

5. The apparatus according to claim 3 or 4, in which the cross-section of the channel is generally constant, with the second channel portion downstream of the bend portion being generally straight while having generally the same cross-section as the first channel portion.

6. The apparatus according to claim 3, in which the bend portion describes an angle of about 20 to 40 degrees relative to the first channel portion and the radius of the bend portion is between 5 and 15 times the width of the channel.

7. The apparatus according to claim 6, in which the bend portion of the channel describes an angle of about 30 degrees relative to the first channel portion and the radius of the bend portion is about 12 times the channel width.

8. The apparatus according to claim 3, in which a leading edge of the port commences at the end of the bend portion of the channel.

9. The apparatus according to claim 3, in which the port comprises a grit removal device including an inlet port which opens to said channel and to said grit collection hopper, and a flow deflector which extends into the channel and into the grit collection hopper downstream of and in fluid communication with the inlet port to divert the flow into the inlet port.

10. The apparatus according to claim 9, in which the inlet port has a horizontal width which is substantially half the horizontal width of the bend portion of the channel.

11. The apparatus according to claim 9, in which the horizontal length of the inlet port is substantially equal to the horizontal width of the channel.

12. The apparatus according to claim 9, in which the flow deflector comprises a vertical member.

13. The apparatus according to claim 9, in which the horizontal width of the flow deflector is at least one quarter the horizontal width of the channel.

14. The apparatus according to claim 13, in which the horizontal width of the flow deflector is equal to about one third of the horizontal width of the channel.

15. The apparatus according to any one of the claims 9 to 14, in which the grit removal device further includes, downstream of the inlet port and flow deflector, an exhaust port coupled to the grit collection hopper, said exhaust port having a width substantially equal to the width of the inlet port.

16. The apparatus according to claim 15, in which the horizontal length of the exhaust port is generally equal to about one quarter of the horizontal width of the channel.

* * * * *